United States Patent Office 3,418,289
Patented Dec. 24, 1968

3,418,289
POLYMERIZATION OF 2,2-DIALKYL-3-PROPIO-
LACTONES USING TERITARY SULFONIUM
SALTS AS INITIATORS
Milton Jones Hogsed, Kinston, N.C., assignor to E. I.
du Pont de Nemours and Company, Wilmington, Del.,
a corporation of Delaware
No Drawing. Filed Oct. 12, 1965, Ser. No. 495,335
5 Claims. (Cl. 260—78.3)

ABSTRACT OF THE DISCLOSURE

Tertiary sulfonium salts of the formula RR'R''S⊕X⊖, wherein R,R' and R'' are hydrocarbyl radicals of 1–12 carbon atoms and X⊖ is an anion, preferably a halide or carboxylate anion, are excellent initiators for polymerization of 2,2-dialkyl-3-propiolactones to form fiber or film-forming polyesters such as polypivalolactone.

This invention relates to a process for preparing polymeric 2,2-disubstituted 3-propiolactones. More particularly, the invention relates to the use of a novel class of initiators for the preparation of the polymeric lactones.

Pivalolactone and other 2,2-disubstituted 3-propiolactones polymerize to form polyesters which can be extruded to form fibers valuable for the production of many textile materials. In particular, the fibers have been found superior to fibers of polyethylene terephthalate and other conventional polyesters for garments which can be laundered after they have been worn, dried quickly, and present a good appearance when worn again without any ironing being required.

Although the 2,2-disubstituted 3-propiolactones can be polymerized without the aid of a catalyst, this is accomplished only with difficulty. Unfortunately, materials such as tetrabutyl titanate, antimony oxide, and arsenic oxide usually employed as catalysts for preparing polyethylene terephthalate and other conventional polyesters are ineffective for preparing polyesters from the 2,2-disubstituted 3-propiolactones.

In accordance with the present invention, it has been found that tertiary sulfonium salts of the formula

RR'R''S⊕X⊖ wherein R, R', and R'' are the same or different hydrocarbyl radicals containing from one to about twelve carbon atoms and X⊖ is an anion, are excellent initiators for the polymerization of 2,2-disubstituted 3-propiolactones.

More specifically described, the invention comprehends a novel process in which a 2,2-disubstituted 3-propiolactone having the formula

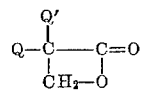

wherein Q and Q' are the same or different alkyl radicals containing from 1 to 4 carbon atoms which may contain chlorine substituents and which may optionally be joined by a carbon-to-carbon bond to form an alicyclic ring, is mixed with a tertiary sulfonium salt of the formula

RR'R''S⊕X⊖

wherein R, R', R'', and X⊖ are as defined above; and the mixture is heated at a temperature in the range of about 50° to about 300° C. until the mixture has polymerized to form a polymeric 2,2-disubstituted 3-propiolactone. The amount of sulfonium salt added is preferably in the range of about 0.0001 to about 1 mol per 100 mols of lactone to be polymerized.

The reaction may be carried out simply by mixing the lactone and the tertiary sulfonium salt and heating the mixture to a temperature of at least about 50° C. until the mixture has polymerized. Elevation of the reaction temperature above the temperature at which heat is applied externally may occur owing to spontaneous evolution of heat. A diluent may also be added to the reaction mixture. Preferred diluents include hexane, heptane, toluene, and other liquid hydrocarbons free from aliphatic unsaturation, since they are solvents for the monomeric lactone but are non-solvents for the polymer; thus, the polymer precipitates once it is formed and is readily separated by filtration.

The hydrocarbyl radicals R, R', and R'' in the tertiary sulfonium salt should contain from one to about twelve carbon atoms and preferably are free from aliphatic unsaturation. The anion X⊖ is preferably a halide or a carboxylate anion, R'''COO⊖. The radical R''' in the carboxylate anion preferably is a hydrocarbyl radical of one to twelve carbon atoms free from aliphatic unsaturation, although other atoms may be present so long as the carboxylate salt is thermally stable in the molten polypivalolactone or other polymerized lactone. Thus, the anion in the tertiary sulfonium salt may be a chloride, bromide, iodide, fluoride, benzoate, acetate, trifluoroacetate, pivalate, or other suitable anion. Typical tertiary sulfonium salts which may be employed in accordance with the present invention include trimethylsulfonium bromide, triethylsulfonium bromide, triphenylsulfonium chloride, triethylsulfonium benzoate, triethylsulfonium iodide, trimethylsulfoxonium iodide, tributylsulfonium bromide, benzyldimethylsulfonium bromide, and dimethylthetin, $(CH_3)_2S^+CH_2CO_2^-$.

Typical 2,2-disubstituted 3-propiolactones which may be employed in accordance with the present invention include pivalolactone (Q=Q'=CH$_3$), 2,2-diethyl-3-propiolactone (Q=Q'=CH$_2$CH$_3$), 2-methyl-2-chloromethyl-3-propiolactone (Q=CH$_3$, Q'=ClCH$_2$), 2,2-bis(chloromethyl)-3-propiolactone (Q=Q'=ClCH$_2$), 2-methyl-2-ethyl-3-propiolactone (Q=CH$_3$, Q'=CH$_2$CH$_3$), 2,2-dipropyl-3-propiolactone (Q=Q'=CH$_2$CH$_2$CH$_3$), 2,2-dibutyl-3-propiolactone (Q=Q'=CH$_2$CH$_2$CH$_2$CH$_3$), and 2,2-pentamethylene-3-propiolactone (Q=Q'=CH$_2$CH$_2$CH$_2$CH$_2$CH$_2$)

Copolymeric components may also be added, including ester-forming monomers such as carbonates, other lactones, and unsaturated compounds such as methyl vinyl sulfone. Preferably, at least 50% of the material to be polymerized comprises the 2,2-disubstituted 3-propiolactone, both on a mol percentage and weight percentage basis.

Although the homopolymer prepared by the polymerization of pivalolactone is designated herein simply as polypivalolactone, the polymer can also be named by such alternative names as poly(oxycarbonyl-1,1-dimethyldimethylene), multi(oxycarbonyl - 1,1-dimethyldimethylene), and poly(hydroxypivalic acid). Similarly, the polymer obtained from 2-chloromethyl-2-methyl-3-propiolactone may be designated as poly(2-chloromethyl-2-methy-3-propiolactone), as poly(oxycarbonyl-1-chloromethyl-1-methyldimethylene), or by various other alternative names.

The following examples will further illustrate the invention, although they are not intended as limitative.

The term "inherent viscosity," as used herein, is defined as the polymer property determined in accordance with the following relationship:

$$\eta_{inh} = \frac{\ln \eta_{rel}}{c}$$

wherein the relative viscosity, $\eta_{rel}$ is calculated by dividing the flow time in a capillary viscometer of a dilute solution of the polymer by the flow time for the pure solvent, trifluoroacetic acid. The concentration (c) used in the examples is 0.5 gram of polymer per 100 ml. of solution and a temperature of 25° C. is employed. It is desirable that the polymer have an inherent viscosity of at least about 0.5 for preparation of films. For the production of fibers an inherent viscosity of at least about 0.75 is desirable.

Example 1

To 25 ml. (24.5 g., 0.245 mol) of pivalolactone in a glass tube is added 0.2 milliliter of a 1 molar solution of trimethylsulfonium bromide in methanol. The mixture is heated to 80° C., whereupon polymerization is quickly initiated as evidenced by ebulliton of the mixture. Although external heating is discontinued, some pivalolactone distills from the molten mass. The product, polypivalolactone, has an inherent viscosity of 1.10 and is readily melt spun to form tenacious fibers. Films melt-pressed from the polymer are tough and flexible.

In a series of three control experiments, 0.2 g. quantities of antimony trioxide, arsenic trioxide, and tetrabutyl titanate are substituted for the trimethylsulfonium bromide solution in the above procedure. In each case the mixture of pivalolactone and additive is heated for one hour in the bath at 90° C. However, the mixtures do not boil or solidify and separation of polymer is not observed.

In another control experiment, pivalolactone containing no additive is heated on a steam bath overnight. The liquid in the tube at the conclusion of this treatment is found to be unreacted pivalolactone containing about 2% by weight of polypivalolactone in suspension.

Example 2

To 25 ml. (24.5 g., 0.245 mol) of pivalolactone in a glass tube is added 50 microliters of a 1 molar solution of triethylsulfonium bromide in methanol. The mixture is heated at 95° C. until the heat of polymerization raises the temperature of the mass to the boiling point of the lactone, whereupon external heating is discontinued. Polypivalolactone having an inherent viscosity of 1.97 is obtained in virtually quantitative yield.

Example 3

Four (4) drops of 50% aqueous triphenylsulfonium chloride is added to 25 ml. of pivalolactone. The mixture is warmed to about 60° C., whereupon exothermic polymerization takes place and pivalolactone distills from the molten mass. The product, polypivalolactone, has an inherent viscosity of 1.83.

In a similar experiment, 150 microliters of triphenylsulfonium chloride in methanol (1 molar) is added to 2.5 ml. of pivalolactone, yielding polypivalolactone having an inherent viscosity of 1.42.

Example 4

To 25 ml. of pivalolactone is added 50 microliters of 0.5 molar triethylsulfonium benzoate in methanol, and the mixture is heated at 85° C. Within two minutes, the pivalolactone begins to boil, whereupon external heating is discontinued. The product, polypivalolactone, has an inherent viscosity of 2.64.

I claim:
1. A process for polymerizing a lactone of the formula

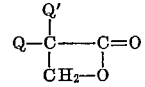

wherein Q and Q' are alkyl radicals of from 1 to 4 carbon atoms which may contain chlorine substituents and which may be joined by a carbon-to-carbon bond to form an alicyclic ring, comprising mixing said lactone with a tertiary sulfonium salt selected from the group consisting of trimethylsulfonium bromide, triethylsulfonium bromide, triphenylsulfonium chloride and triethylsulfonium benzoate, in the range of about 0.0001 to about 1 mol per 100 mols of lactone to be polymerized, and heating the mixture at a temperature in the range of about 50° to about 300° C. until the lactone has polymerized.

2. The process of claim 1 wherein the tertiary sulfonium salt is trimethylsulfonium bromide.

3. The process of claim 1 wherein the tertiary sulfonium salt is triethylsulfonium bromide.

4. The process of claim 1 wherein the tertiary sulfonium salt is triphenylsulfonium chloride.

5. The process of claim 1 wherein the tertiary sulfonium salt is triethylsulfonium benzoate.

References Cited

UNITED STATES PATENTS 3,039,998   6/1962   Boerma _____ 260—75

FOREIGN PATENTS 1,377,361   11/1964   France.
1,163,544   2/1964   Germany.

JOSEPH L. SCHOFER, *Primary Examiner.*

J. C. HAIGHT, *Assistant Examiner.*

U.S. Cl. X.R.

260—77.5